Patented Nov. 19, 1935

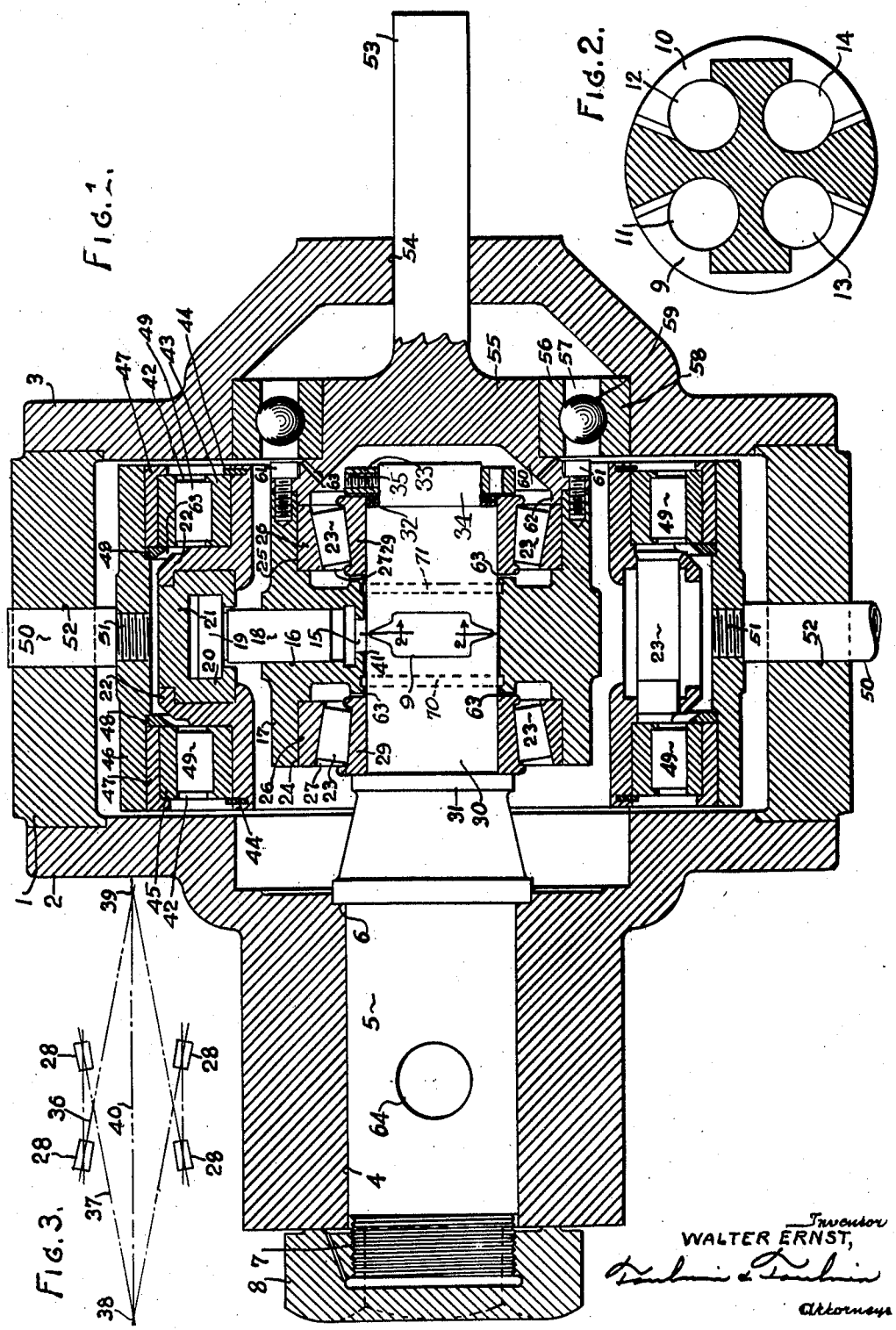

2,021,353

UNITED STATES PATENT OFFICE 2,021,353

HYDRAULIC PUMP OR MOTOR

Walter Ernst, Mount Gilead, Ohio, assignor to The Hydraulic Press Mfg. Company, Mount Gilead, Ohio, a corporation of Ohio Application March 5, 1934, Serial No. 713,997

7 Claims. (Cl. 103—161)

This invention relates to fluid pressure pumps or motors and, in particular, to hydraulic pumps or motors which employ rotors revolving upon pintles. The problem faced by the applicant in making his invention was to devise a bearing construction for supporting the primary rotor or cylinder body relative to the pintle so as to permit rotation and prevent metal-to-metal contact between the rotor and the pintle, this metal-to-metal contact causing heating, scoring, and eventual binding of the mechanism, as has commonly occurred in previously known types of pumps or motors using plain, ball, or needle bearings.

One object of my invention is to provide a hydraulic pump or motor having a primary rotor or cylinder body rotatably mounted upon a pintle by means of spaced tapered roller bearings which resist both radial and axial thrust, hence likewise resist deformation of the primary rotor and/or pintle relative to one another, thereby preserving the oil film between these parts and preventing binding and scoring of the pintle or rotor.

Another object is to provide such a hydraulic pump or motor with spaced tapered roller bearing supports whereby the primary rotor or cylinder body and the pintle or fluid-distributing valve will be maintained spaced apart from one another by an amount greater than the diametral clearances of the bearings, thereby providing a sufficient amount to insure the constant presence of a lubricant film, thereby properly sealing the pump or motor and preventing metal-to-metal contact and leakage, and at the same time insuring the concentration of the load upon the tapered roller bearings rather than upon the lubricant film between the pintle and the cylinder body under high working pressures.

Another object is to provide such a bearing construction which will prevent relative deformation between the primary rotor and pintle by distributing the stresses and thrusts arising from high working pressures, this distribution being accomplished by the use of tapered roller bearings spaced apart from one another and having the axes of their rotary elements converging toward a common point in each bearing, this common point lying substantially upon the axis of rotation of the primary rotor, and hence upon the axis of the pintle.

Another object is to provide such a bearing construction between the primary rotor and the pintle that will provide for adjustability so as to maintain the diametral clearance of the bearing less than the clearance between the cylinder body and the pintle or fluid distributing valve and thereby provide a tapered roller bearing which will rotatably support the working load with smaller overall dimensions than are possible with bearings previously used.

In the drawing:

Figure 1 is a central horizontal section through the hydraulic pump or motor of my invention.

Figure 2 is a section through the pintle along the line 2—2 of Figure 1, showing the arrangement of ports for distributing the pressure fluid to the various cylinders.

Figure 3 is a diagrammatic view showing the arrangement of the axes of the multiple-element rotary bearings relative to the axes of the primary rotor and pintle.

Referring to the drawing in detail, Figure 1 shows a hydraulic pump or motor of the type employing radial cylinders and pistons disposed within a cylinder block which rotates around a fixed pintle having pressure fluid ducts passing therethrough.

This pump or motor is provided with a casing 1 closed by end plates 2 and 3. The former is provided with a bore 4 adapted to support a fluid distributing valve or pintle 5 therein, this pintle having bored passages 11, 12, 13, 14 (Fig. 2) adapted to conduct fluid to and from the cylinders hereinafter described. The pintle 5 is provided with a shouldered portion 6 which engages the end plate 2; and likewise with a threaded portion 7 having a nut 8 threaded thereon and making contact with the opposite face of the end plate 2. When the nut 8 is tightened, it clamps the end plate 2 firmly between the enlargement 6 on the pintle and the nut 8. In this way the pintle is firmly and rigidly supported in the end plate 2.

The pressure fluid ducts 11, 12, 13, 14 (Fig. 2) with which the fluid distributing valve or pintle 5 is provided terminate in valve openings 9 and 10 which distribute the pressure fluid to the ports 15 of radially disposed cylinders 16 located in a primary rotor or cylinder body 17 adapted to rotate around the pintle 5. The cylinders 16 are provided with pistons 18 having cross heads 19 adapted to reciprocate in tangential grooves 20 in guide blocks 21. The latter are clamped between the secondary rotor halves 22, as by the clamping members 23.

The primary rotor 17 is provided with countersunk bores 24 and 25 adapted to receive the outer races 26 of tapered roller bearing assemblies, generally designated 27, and having tapered rolls 28 rotatable upon inner races 29. The inner races 29 are mounted upon the reduced diameter portion 30 of the pintle 5. One of the inner bearing races 29 rests against the shouldered portion 31 adjacent to the reduced pintle portion 30, whereas the opposite inner bearing race 29 is held in position by a shim 32 held in place by a collar 33 engaging the end portion 34 of the pintle 5. The collar 33 is held in position by the headless set screw 35.

In this manner the primary rotor 17 is free to rotate around the reduced portion 30 of the pintle 5, friction being reduced by the multiple roller elements 28 of the tapered roller bearings 27. The axes 36 and 37 of the tapered roller elements 28 converge toward the common points 38 and 39 on the axis 40 of the primary rotor 17 and pintle 5 (Fig. 3). By this construction the spaced tapered roller bearings 27 are capable of sustaining both radial and axial thrusts. The narrow clearance space 41 between the primary rotor or cylinder body 17 and the reduced pintle portion 30 is provided for an oil film, and this space 41 must be kept of a finite width, such as about 1/1000 of an inch. If the pintle 5 and the primary rotor 17 become deformed or bent relative to one another under the stresses of high working pressures, so that the space 41 partly disappears, allowing metal-to-metal contact therebetween, heating and scoring would quickly develop, causing rapid wear of the machine. This has been a common disadvantage in previously known types of hydraulic pumps or motors.

By my invention, however, the diametral clearances of the spaced tapered roller bearings 27 are maintained less than the clearance 41 between the cylinder body 17 and the pintle 5, hence, the cantilever action of the pressure and stresses set up during the operation of the pump is effectively prevented from causing metal-to-metal contact between the cylinder body 17 and the pintle 5, and the thrusts properly distributed whether radial or axial in direction. The tapered roller bearings thus carry the load, rather than the oil film in the clearance space 41, and also effectively resist any end thrusts which may be present, as well as the usual radial thrusts arising in operation.

In this way the oil space 41 is constantly maintained, without metal-to-metal contact yet with a minimum width thereof. The oil film in the space 41 is provided not only to lubricate the relatively rotating parts 17 and 30, but also to seal the connection between them so as to prevent leakage of the pressure fluid. It is, therefore, essential that this space 41 be kept as narrow as possible, yet wide enough to prevent metal-to-metal contact. My provision of tapered roller bearings spaced apart from one another and with their total diametral clearances less than the clearance space 41 solves this problem and provides a successful construction for use under excessive operating pressures where previously known types of pumps or motors have failed.

The secondary rotor halves 22 are likewise supported in multiple-element rotary bearings, such as the roller bearings generally designated 42. The inner races 43 of these bearings are held upon the secondary rotor halves 22 by means of the retaining rings 44, whereas the outer races 45 are held in place within the shifter ring 46 of the machine by means of the annularly flanged retaining bands 47 and the retaining rings 48 respectively. Thus the secondary rotor halves 22 are free to rotate within the shifter ring 46, the friction being reduced by means of the rollers 49 of the roller bearings 42. The latter are not of tapered construction since they are not subject to end thrusts or cantilever action arising in the case of the rotation of the primary rotor 17 around the pintle 5, as previously explained.

The shifter ring 46 is provided for the purpose of shifting the axis of rotation of the secondary rotor halves 22 relative to that of the primary rotor 17. This results in the radial reciprocation of the pistons 18 within the cylinders 16, and also in the tangential reciprocation of the cross heads 19 in the guide blocks 21. The shifter ring 46 is shifted to and fro by means of the shifting rods 50 secured in the threaded bores 51 and passing through the bores 52 of the casing 1. This shifting may be accomplished in a number of ways well known to those skilled in the art.

Power is communicated to or from the primary rotor 17, (depending on whether the machine is used as a pump or motor) by means of the drive shaft 53 passing through the bore 54 in the end plate 3 and carrying the enlarged portion 55. The latter is provided with the inner races 56 of ball bearings, generally designated 57, the outer races 58 of which are held secured within the end plates 3. In this manner the balls 59 permit the free rotation of the drive shaft 53 relative to the end plates 3, yet support it against deflection under the heavy loads encountered in operation.

Beyond the bearing 57 the enlarged portion 55 of the drive shaft 53 has an outwardly extended portion 60 which is secured to one end of the primary rotor 17, as by the set screws 61 and the annular ridge 62. The passageways 63 leading to the various roller and ball bearings facilitate the distribution of lubricant thereto, and also release the oil which accumulates in the chamber due to leakage past the fit between the pintle portion 30 and the primary rotor 17. This prevents the strain which would result by the gradual building up of pressure due to this leakage.

For supplying or withdrawing pressure fluid from the machine, the pintle 5 is provided with radial ducts 64 which pass outward and communicate with similar ducts in the end plate 2, the latter ducts in turn communicate with piping leading to the external sources and supplies of fluid.

Heretofore in radial pumps or motors actuated by pressure fluid, the pintle has been supported at one end only, that of the end plate in which it is mounted, and the working load has been supported by the oil film between the pintle and the cylinder body or primary rotor. The pintle thus extended inwardly in a cantilever manner, resulting in a deflection or deformation thereof when the machine operated under high working pressures. The enormous difference between the forces on the discharge and intake sides of the pump in this prior art construction caused this deflection of the pintle despite the many attempts made to eliminate it or to balance the pressure load. When the pintle was thus deflected or deformed it squeezed out the oil film between itself and the primary rotor on the intake side of the pump, causing the primary rotor and pintle to engage one another in metal-to-metal contact. This in turn resulted in friction, heating, scoring and wear of the parts, with eventual breakdown of the machine.

My improved construction, however, prevents the breakdown of the oil film in the space 41 caused by this relative deformation between the pintle 5 and the primary rotor 17, through the provision of the tapered roller bearings 27, with total diametral clearances less than the clearance constituting the space 41; and the hitherto unsupported end of the pintle is now supported, not only by the tapered roller bearing 27 in the counterbore 25, but also by the ball bearing 57 supporting the drive shaft 53 which is attached to the primary rotor 17 in the manner previously described. My improved construction has been found to maintain a satisfactory thickness of oil film in the space 41 between the reduced pintle portion 30 and the primary rotor 17, and results in a pump or motor which has been found capable of operating at extremely high pressures and over long periods of time without interruptions.

The tapered roller bearings used in my improved construction have the quality of transmitting and supporting greater loads without breakdown than a straight roller or ball bearing of the same outside dimensions. In the prior art it has been found practically impossible to use ball bearings between the primary rotor and the pintle, due to the large outside dimensions which these bearings would possess if of a sufficient size to carry the heavy working load, and also because the total diametral clearance of the bearing resulting from the additive effects of the manufacturing tolerances necessitated for the balls and the two races exceeds the width of the clearance space 41, without any means of making it less. It is preferable, however, to place the bearings between the primary rotor and the pintle rather than on the outside of the primary rotor, supporting the roller bearings in the end housings of the pump. Exact alignment is afforded when the bearings are placed between the rotor and the pintle, whereas with bearings on the outside of the rotor, it will give opportunities for misalignment between the various parts.

Straight roller bearings have also been found impractical because they must also be made with manufacturing tolerances whose additive effect gives too much diametral clearance relatively the limited width of the space 41 necessitated by the conditions under which a high pressure hydraulic pump or motor is required to operate. This clearance is sufficient to permit the pintle to deflect enough to engage the rotor in disastrous metal-to-metal contact, yet cannot be reduced or adjusted to prevent such contact and at the same time permit free rotation without excessive leakage of the high pressure fluid. The tapered roller bearings used in my construction provide for the adjustment of this diametral clearance in a very accurate manner thus enabling the setting of this clearance at a lower figure than that of the space 41, hence, the pump or motor will operate safely at the maximum efficiency.

The adjustment of the inner bearing race 29 is accomplished by having the pintle slightly shorter than the remainder of the assembly, and by putting shims 32 on the ends of the pintle: the shims 32 are caused to engage the annular shoulder between the pintle portion 34 and 30 and also the inner annular portion of the face of the collar 33, the outer annular portion thereof engaging the bearing races 29. If it is desired to take up clearance on the bearings, one or more of the shims can be taken out and the collar 33 drawn up a corresponding amount. In this manner it is possible to adjust the bearing to any amount of diametral clearance required. Instead of the set screw 35 a lock nut may optionally be employed.

The primary rotor 17 within its pintle bore is provided with a pair of annular grooves 70 and 71, located on opposite sides of the valve openings 9 in the pintle 5, and spaced apart therefrom. The high pressure fluid which escapes from the valve openings 9 through the spaces 41 passes into the grooves 70 and 71 and is carried around to the opposite side of the pintle, thus balancing its own thrust over the area between the two grooves 70 and 71. This provision positively limits the high pressure to a known and definite area, where its effects may be exactly calculated and allowed for, thus enabling the force which must be carried by the bearing to be accurately predetermined.

It will be understood that I desire to comprehend within my invention such modifications as may be necessary to adapt it to varying conditions and uses.

Having thus fully described my invention what I claim as new and desire to secure by Letters Patent, is:

1. In a fluid pressure pump or motor, a fluid distributing valve, a cylinder body, said cylinder body and said fluid distributing valve being mounted for rotation relatively to one another, cylinders in said cylinder body arranged to communicate with said fluid distributing valve, pistons arranged to reciprocate in said cylinders, means to impart reciprocation to said pistons, and a plurality of tapered roller bearing assemblies mounted between said cylinder body and said fluid distributing valve, the total diametral clearance between the elements of each bearing assembly being less than the clearance between said cylinder body and said fluid distributing valve.

2. In a fluid pressure pump or motor, a fluid distributing valve, a cylinder body, said cylinder body and said fluid distributing valve being mounted for rotation relatively to one another, cylinders in said cylinder body arranged to communicate with said fluid distributing valve, pistons arranged to reciprocate in said cylinders, a secondary rotor mounted for rotation upon an axis independent of the axis of said cylinder body, said pistons being arranged to engage said secondary rotor to cause reciprocation of said pistons, and a plurality of tapered roller bearing assemblies mounted between said cylinder body and said fluid distributing valve, the total diametral clearance between the elements of each bearing assembly being less than the clearance between said cylinder body and said fluid distributing valve.

3. In a fluid pressure pump or motor, a fluid distributing valve, a cylinder body, said cylinder body and said fluid distributing valve being mounted for rotation relatively to one another, cylinders in said cylinder body arranged to communicate with said fluid distributing valve, pistons arranged to reciprocate in said cylinders, a secondary rotor mounted for rotation upon an axis independent of the axis of said cylinder body, crossheads on said pistons engaging said secondary rotor to impart reciprocation to said pistons, and a plurality of tapered roller bearing assemblies mounted between said cylinder body and said fluid distributing valve, the total diametral clearance between the elements of each bearing assembly being less than the clearance between said cylinder body and said fluid distributing valve.

4. In a fluid pressure pump or motor, a fluid distributing valve, a cylinder body, said cylinder body and said fluid distributing valve being mounted for rotation relatively to one another, cylinders in said cylinder body arranged to communicate with said fluid distributing valve, pistons arranged to reciprocate in said cylinders, means to impart reciprocation to said pistons, and a plurality of tapered roller bearing assemblies mounted between said cylinder body and said fluid distributing valve, the total diametral clearance between the elements of each bearing assembly being less than the clearance between said cylinder body and said fluid distributing valve, said fluid distributing valve having a port for distributing fluid to said cylinders, and said bearing assemblies being mounted on opposite sides of said port.

5. In a fluid pressure pump or motor, a fluid distributing valve, a cylinder body, said cylinder body and said fluid distributing valve being mounted for rotation relatively to one another, cylinders in said cylinder body arranged to communicate with said fluid distributing valve, pistons arranged to reciprocate in said cylinders, means to impart reciprocation to said pistons, a plurality of tapered roller bearing assemblies mounted between said cylinder body and said fluid distributing valve, the total diametral clearance between the elements of each bearing assembly being less than the clearance between said cylinder body and said fluid distributing valve, and means for adjusting the diametral clearances of said bearing assemblies.

6. In a fluid pressure pump or motor, a fluid distributing valve, a cylinder body, said cylinder body and said fluid distributing valve being mounted for rotation relatively to one another, cylinders in said cylinder body arranged to communicate with said fluid distributing valve, pistons arranged to reciprocate in said cylinders, means to impart reciprocation to said pistons, and a plurality of tapered roller bearing assemblies mounted between said cylinder body and said fluid distributing valve, the total diametral clearance between the elements of each bearing assembly being less than the clearance between said cylinder body and said fluid distributing valve, said fluid distributing valve having a reduced portion forming a shoulder, and said bearing assemblies having relatively movable races, shims on said reduced portion and an adjusting member on said reduced portion arranged to engage said shims and one of said races, whereby to adjust the diametral clearances of said tapered roller bearings.

7. In a fluid pressure pump or motor, a fluid distributing valve, a cylinder body, said cylinder body and said fluid distributing valve being mounted for rotation relatively to one another, cylinders in said cylinder body arranged to communicate with said fluid distributing valve, pistons arranged to reciprocate in said cylinders, means to impart reciprocation to said pistons, and a plurality of tapered roller bearing assemblies mounted between said cylinder body and said fluid distributing valve, the total diametral clearance between the elements of each bearing assembly being less than the clearance between said cylinder body and said fluid distributing valve, said fluid distributing valve having a plurality of reduced diameter portions forming a pair of shoulders thereon, and said bearing assemblies having relatively movable outer and inner races, one of said inner races abutting one of said shoulders, shims arranged to engage the second shoulder and an adjusting member arranged to simultaneously engage said shims and the other of said inner races.

WALTER ERNST.